(12) United States Patent
Salou et al.

(10) Patent No.: US 6,634,208 B2
(45) Date of Patent: *Oct. 21, 2003

(54) BEARING AND INTERFACE ASSEMBLY COMPRISING AT LEAST ONE ELASTIC DEFORMATION ZONE AND A BRAKING ASSEMBLY COMPRISING IT

(75) Inventors: Arnaud Salou, Annecy (FR); Christophe Nicot, Epagny (FR); Olivier Blanchin, Annecy (FR)

(73) Assignee: S.N.R. Roulements, Annecy Cedex (FR)

( * ) Notice: Subject to any disclaimer, the term of this patent is extended or adjusted under 35 U.S.C. 154(b) by 55 days.

This patent is subject to a terminal disclaimer.

(21) Appl. No.: 09/915,533

(22) Filed: Jul. 27, 2001

(65) Prior Publication Data

US 2002/0012484 A1 Jan. 31, 2002

(30) Foreign Application Priority Data

Jul. 28, 2000 (FR) ............................................ 00 09990

(51) Int. Cl.⁷ .............................................. G01M 17/04
(52) U.S. Cl. ................. 73/11.07; 73/862.631; 73/862.044; 73/862.541; 384/448
(58) Field of Search ..................... 384/448; 73/11.07, 73/862.631, 862.044, 862.541

(56) References Cited

U.S. PATENT DOCUMENTS

| | | | | |
|---|---|---|---|---|
| 4,667,521 A | * | 5/1987 | Fuss et al. | 73/862.541 |
| 5,186,042 A | * | 2/1993 | Miyazaki | 73/118.1 |
| 5,821,434 A | * | 10/1998 | Halliday | 73/862.541 |
| 5,892,139 A | * | 4/1999 | Miyazaki | 73/9 |
| 5,964,511 A | * | 10/1999 | Miyazaki | 303/191 |
| 6,002,248 A | * | 12/1999 | Binder | 324/160 |
| 6,295,878 B1 | * | 10/2001 | Berme | 73/862.044 |
| 6,311,541 B1 | * | 11/2001 | Miyazaki | 73/11.07 |
| 6,324,919 B1 | * | 12/2001 | Larsen et al. | 73/862.043 |
| 6,345,530 B1 | * | 2/2002 | Miyazaki | 73/118.1 |
| 6,354,675 B1 | * | 3/2002 | Miyazaki | 303/150 |
| 6,439,063 B1 | * | 8/2002 | Schnackenberg | 73/862.041 |
| 6,471,407 B1 | * | 10/2002 | Katano | 384/448 |

FOREIGN PATENT DOCUMENTS

EP          0 432 122 A2    6/1991

* cited by examiner

*Primary Examiner*—Jack Lavinder
*Assistant Examiner*—Benjamin A Pezzlo
(74) *Attorney, Agent, or Firm*—Nixon Peabody LLP; David S. Safran

(57) ABSTRACT

The object of the invention is an assembly comprising a bearing (1) and a mechanical interface (5) associated, by means of association means (7), with the fixed raceway (2) of the bearing (1), this interface (5) being intended to be interposed between the fixed raceway (2) of the bearing (1) and the fixed structure, the said interface (5) comprising:

- first means (8) of fixing to the fixed structure;
- second means (9) of fixing a device (10) intended to apply a force to the rotating member (6); and
- at least one elastic deformation zone (29–33) able to be deformed under the action of forces exerted on the said assembly, at least one sensor (38) able to measure the said forces being functionally associated with the said elastic deformation zone (29–33).

22 Claims, 11 Drawing Sheets

BEARING AND INTERFACE ASSEMBLY COMPRISING AT LEAST ONE ELASTIC DEFORMATION ZONE AND A BRAKING ASSEMBLY COMPRISING IT

The invention concerns an assembly comprising a bearing and a mechanical interface, a braking assembly comprising such an assembly, and an application of these braking assemblies to measuring the torque and the forces applied to one or each of the wheels of a vehicle and to the regulation of at least one control of the vehicle.

Bearings are already known of the type comprising a fixed raceway intended to be associated with a fixed structure, a rotating raceway intended to be associated with a rotating member, and rolling bodies disposed between them.

When it is wished to know forces applied by the fixed structure to the rotating structure, it is known that attached parts forming measuring units can be disposed at the connection between the fixed raceway and the fixed structure.

The document EP-A-0 432 122 illustrates this technology, providing a measuring unit rigidly fixed to the fixed raceway, this measuring unit comprising an annular support and a plurality of sensors associated with the support in predetermined orientations with respect to the axis of rotation.

This type of technology has a certain number of drawbacks.

This is because the presence and multiplicity of the attached measuring units make assembly of the bearing tricky and complex.

The fixed raceway, by trapping the measuring units when the bearing is assembled, subjects them to prestressing which is detrimental to the subsequent measurements of forces.

Moreover, when it is wished also to know the braking torque applied to a wheel by means of a brake calliper, this type of technology cannot be envisaged.

The invention therefore aims to remedy these drawbacks by proposing an assembly comprising a bearing and an interface intended to be interposed between the fixed raceway of the bearing and the fixed structure, the said interface comprising, in an integrated fashion, deformation zones instrumented by means of sensors, and which makes it possible to measure both the forces resulting from the static and dynamic behaviour of the vehicle and the braking torque exerted on a wheel of the vehicle.

To this end, and according to a first aspect, the invention proposes an assembly comprising:

a bearing of the type comprising a fixed raceway intended to be associated with a fixed structure, a rotating raceway intended to be associated with a rotating member, and rolling bodies between them; and a mechanical interface associated with the said fixed raceway by means of association means, this interface being intended to be interposed between the fixed raceway of the bearing and the fixed structure, the said interface comprising:

first means of fixing to the fixed structure;

second means of fixing a device intended to apply a force to the rotating member; and at least one elastic deformation zone able to be deformed under the action of forces exerted on the said assembly, at least one sensor able to measure the said forces being functionally associated with the said elastic deformation zone.

According to one embodiment, the interface comprises two flat faces extending radially and connected together by a circumferential face, a bore with a diameter substantially greater than the outside diameter of the fixed raceway being formed in the said interface.

The interface can then comprise first radial projections in which axial holes are formed for fixing the assembly by screwing onto the fixed structure, two adjacent projections being separated by a zone with a lesser axial and/or radial dimension forming an elastic deformation zone, on which the sensor or sensors are disposed.

According to one embodiment, the interface comprises four first projections disposed substantially at 90° with respect to each other, defining between them four elastic deformation zones on each of which at least one sensor is disposed.

The interface can comprise second radial projections forming second means of fixing to the bearing the device intended to apply a force to a rotating part associated with the rotating raceway, the projections comprising a base zone and an end zone.

According to one embodiment, the second projections comprise axial holes for fixing the said device by screwing, located in the end zone, at least one sensor being disposed on or in the vicinity of the base zone, this forming an elastic deformation zone.

Two sensors can then be disposed on the circumferential face, on each side of each projection and/or at least one sensor can be disposed on one of the flat faces.

A radial dimension of the second projections can be greater than a radial dimension of the first projections.

According to one embodiment, the interface comprises:

four first projections disposed substantially at 90° with respect to each other, defining between them three elastic deformation zones on each of which at least one sensor is disposed; and two second projections located between two adjacent first projections, each second projection being provided with at least one sensor.

As a variant, openings are formed in the first and/or second projections, sensors being disposed on the internal faces of the openings.

According to a first embodiment, the first fixing means also form means of associating the interface with the fixed raceway of the bearing.

In a variant, the fixed raceway comprises a flange comprising radial projections in which axial holes are formed, disposed opposite those of the first fixing means so as to provide the fixing of the interface by screwing onto the bearing.

According to a second embodiment, the means of associating the interface on the bearing are distinct from the first and second fixing means.

In a variant, the fixed raceway comprises a radial flange, axial holes being formed opposite the said flange and in the interface so as to provide their association by screwing.

According to one embodiment, the elastic deformation zone or zones are located in the vicinity of the first and/or second fixing means and/or in the vicinity of the association means, the sensor or sensors located in the vicinity of the first fixing means and/or in the vicinity of the association means are then arranged so as to measure the forces applied to the first fixing means and/or transmitted to the fixed raceway, as well as their respective movements, in three orthogonal directions forming together a trihedron.

In a variant, the sensor or sensors located in the vicinity of the second fixing means are arranged so as to measure the forces applied to the second fixing means, as well as their respective movements, in three orthogonal directions forming together a trihedron.

The sensors can be or comprise:
strain gauges based on piezoresistive elements;
acoustic surface wave sensors;
magnetic field sensors.

According to one embodiment, at least one sensor is disposed on an intermediate part fixed to an elastic deformation zone by embedding, welding, adhesive bonding or the like.

According to a second aspect, the invention concerns a braking assembly comprising an assembly as described above and a brake calliper associated with the mechanical interface by means of the second fixing means, the so-called calliper being separate from the fixed structure.

The braking assembly can also comprise a brake disc associated with the rotating raceway, inserted between the jaws of the calliper so that this applies a braking force to it by bringing the jaws together.

According to a third aspect, the invention concerns an application of such assemblies to the measurement on the one hand of the braking torque of a vehicle and on the other hand the longitudinal, transverse and vertical forces exerted on one or each of its wheels, in which an assembly is associated with one or each of the wheels, the torque being measured by means of the sensors located in the vicinity of the second fixing means and/or in the vicinity of the association means and the forces by means of the sensors located in the vicinity of the first fixing means.

According to one embodiment, a control device collects the measurements of the braking torque and/or of the forces exerted on the wheels, this device being arranged so as to regulate at least one dynamic control of the vehicle, notably the braking, the acceleration, the steering or the suspension as a function of the said measurements.

Other objects and advantages of the invention will emerge during the following description, given with reference to the accompanying drawings, in which:

FIG. 1 is a perspective view of an assembly comprising a bearing and an interface according to the invention, the rotating internal raceway being fitted on a wheel hub; according to the embodiment illustrated, the interface comprises several elastic deformation zones able to be deformed under the action of forces exerted on the bearing, and sensors able to measure these forces are associated with these deformation zones; the hub comprising a flange on which a brake disc of a motor vehicle is intended to be associated;

Figure 9:
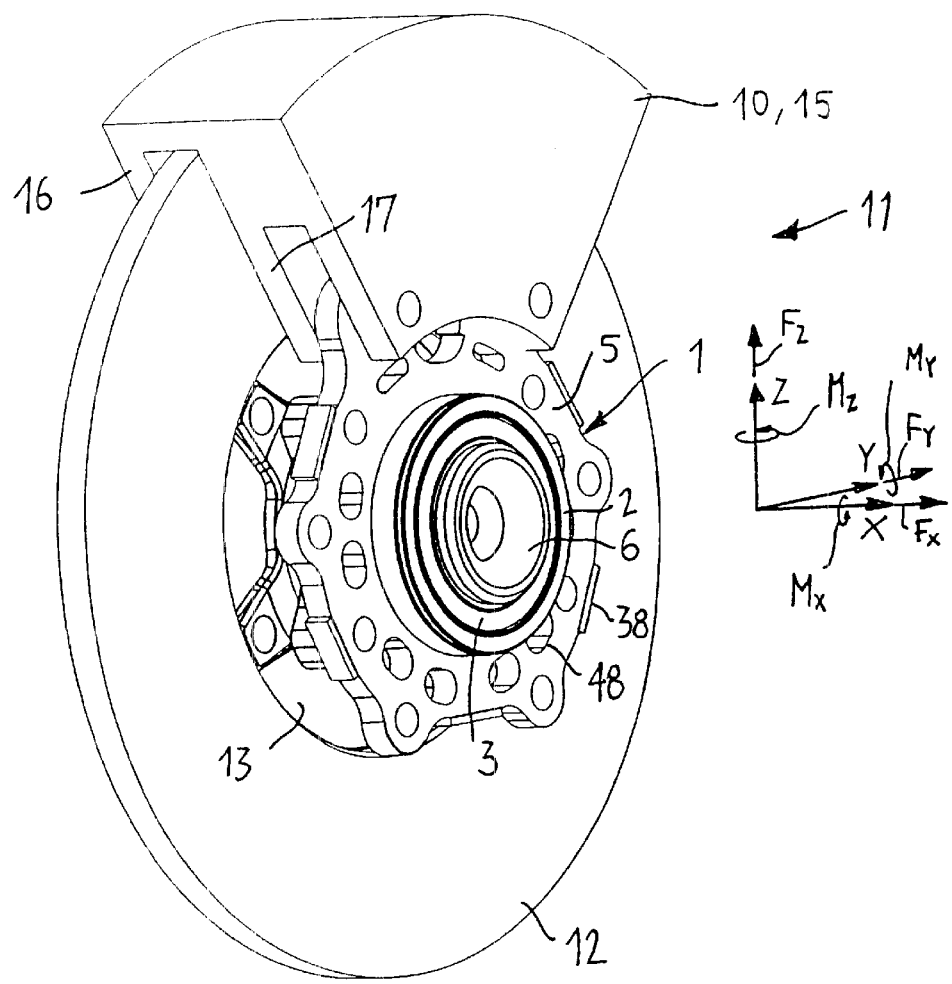
FIG. 9 is a perspective view of a braking assembly comprising an assembly like the one in FIG. 8, a brake calliper associated with the interface and a brake disc associated with the rotating raceway.
Figure 10:
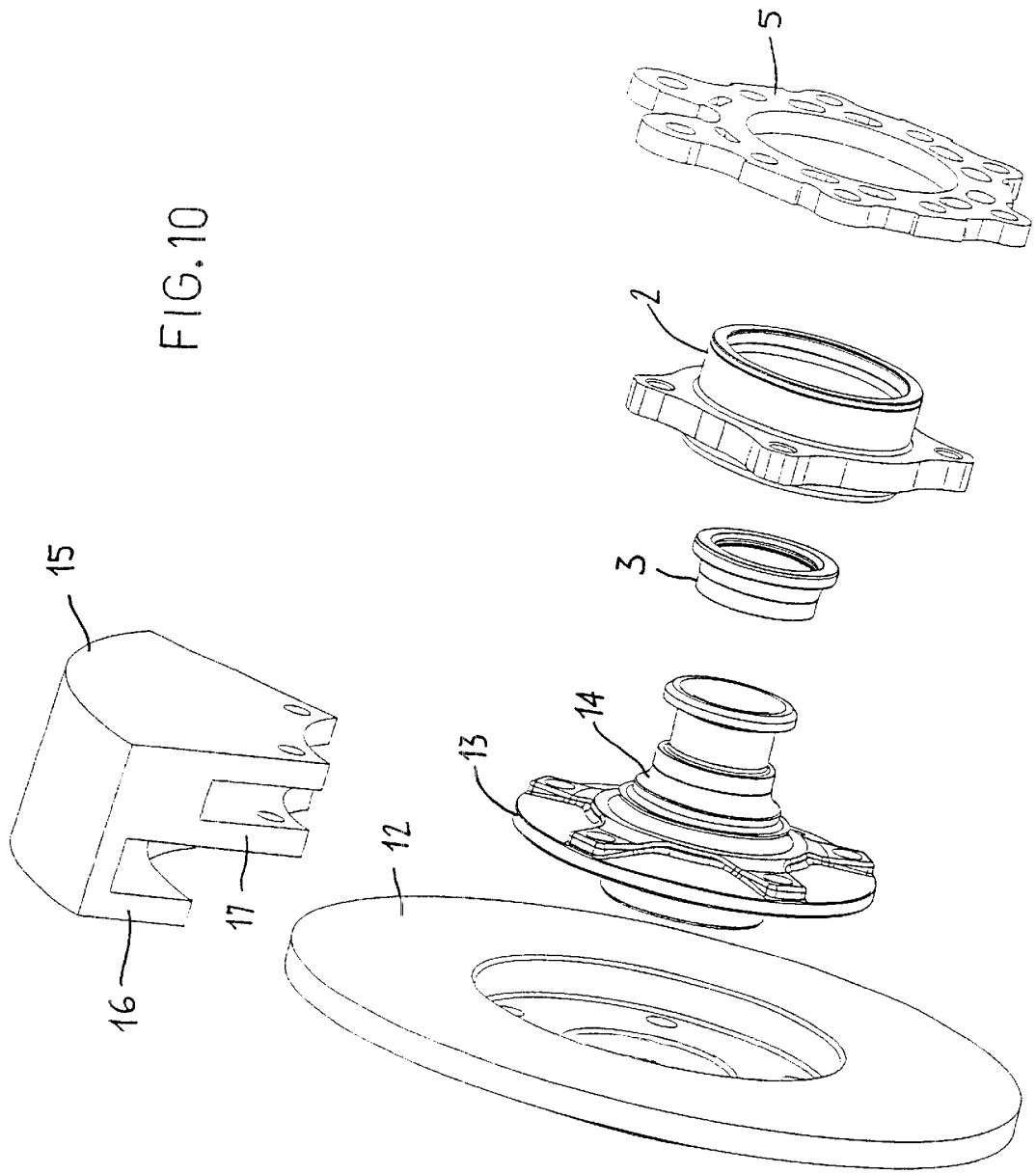
FIG. 10 is an exploded view of the braking assembly depicted in FIG. 9 in which the hub and internal raceway each comprise a rolling track for the rolling bodies; in this figure, the rolling bodies, the cages, the joints and the sensors are not shown.
Figure 12:
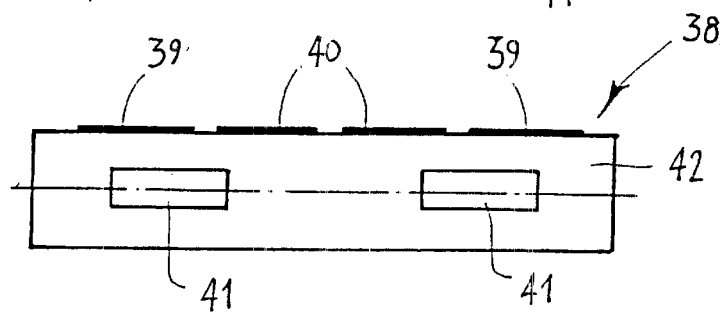
Figure 13:
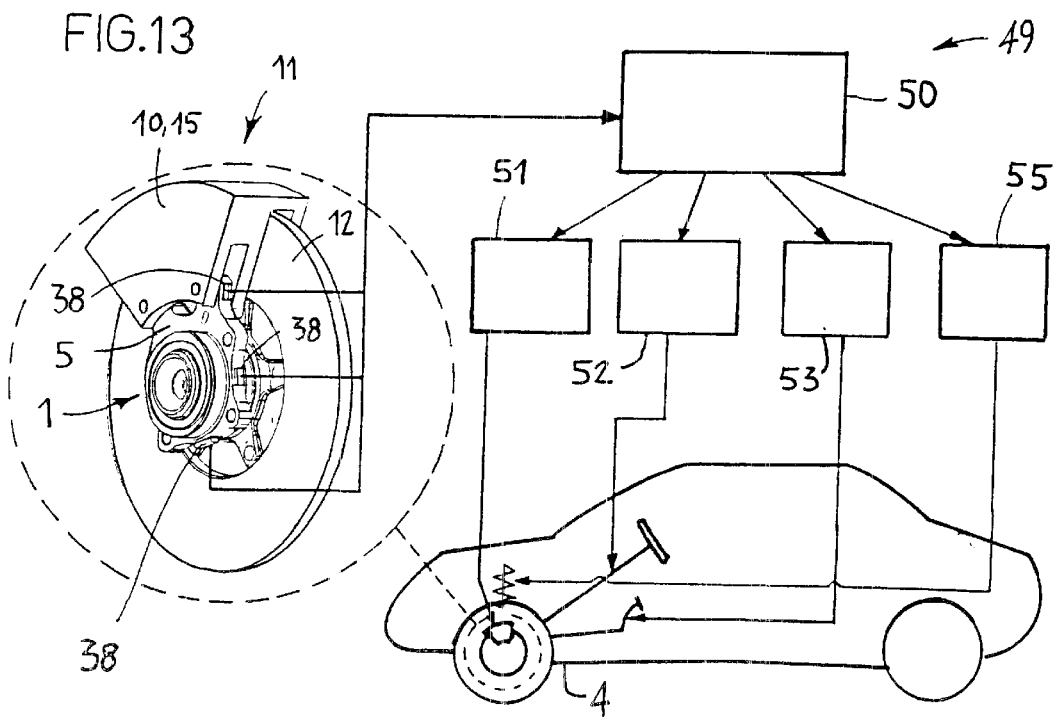

FIG. 12 is a side view of the sensor of FIG. 10, which comprises on its lateral face two strain sensors for measuring other bending deformations undergone by the substrate; and FIG. 13 is a diagram illustrating an application of the assembly of FIG. 9 to measuring the braking torque of the vehicle; in this figure, a control device collects the measurements of the braking torque and/or the forces exerted on the wheels; this device is connected to four vehicle control units for regulating the braking, the acceleration, the steering or the suspension as a function of the measurements collected.

FIGS. 1 to 10 depict a bearing 1 which comprises a fixed outer raceway 2 and a rotating inner raceway 3, and rolling bodies between them (not shown in the figures).

The fixed raceway 2 is intended to be associated with a fixed structure such as the chassis of a vehicle 4 by means of an interface 5, whilst the rotating raceway 3 is intended to be associated with a rotating member 6.

To this end, the interface 5 comprises on the one hand means 7 of associating the interface 5 with the fixed raceway 2 and on the other hand first means 8 of fixing the interface 5 to the fixed structure.

In addition the interface 5 comprises second means 9 of fixing a device 10 intended to apply a force to the rotating member 6.

Once associated, the bearing 1 and the interface 5 form an assembly which is intended on the one hand to be associated with a fixed structure by means of the first fixing means 8 and on the other hand to associate the device 10 by means of the second fixing means 9.

In an application illustrated in FIGS. 9 and 10, the assembly 1 is integrated into a braking assembly 11 which comprises a brake disc 12 mounted on a flange 13 on the hub 14, and a calliper 15 having two jaws 16, 17 disposed on each side of the disc 12 in order to exert a braking force F on it by gripping the disc 12 when the jaws 16, 17 are brought together.

In a first variant depicted in FIGS. 1 to 8, the rotating raceway 3 is fitted on the hub 14 which extends coaxially with the disc 12, the disc 12 and the hub 14 forming part of the rotating member 6 mentioned above.

In a second variant depicted in FIGS. 9 and 10, the hub 14 comprises at least one of the rolling tracks of the rolling bodies so as to form part of the rotating raceway 3. In this variant, the hub 14 is for example crimped to the fixed raceway 2 and the rotating member 6 comprises the disc 12 mounted on the flange 13.

Three arbitrary directions depicted in FIGS. 1 to 9 are defined in relation to the braking assembly 11 in order to facilitate the present description: an axial direction X, referred to as longitudinal, merged with the axis of the bearing 1, the axis of the disc 12 and the axis of the hub 14; and two radial directions perpendicular to the axial direction and perpendicular to each other: a direction Y referred to as transverse and a direction Z referred to as elevation, so that the three directions X, Y, Z form a direct trihedron in space.

It is assumed for more convenience that, in the case of the braking assembly 11, the elevation direction Z is perpendicular to the ground, whilst the longitudinal X and transverse Y directions are parallel to the ground.

A location close to the axis of the bearing 1 is said to be inner, whilst a location at a distance from the axis is said to be outer.

Forces are applied by the fixed structure to the first fixing means 8 or vice-versa, notably during movements (pitch, roll, yaw) of the chassis of the vehicle 4 with respect to its wheel and axle sets, due to acceleration, bends, suspension movements and braking.

These forces result in forces in the three directions X, Y, Z, and movements about axes parallel to these three directions.

It is wished to measure at least some of these forces.

In the embodiments depicted, the fixed raceway comprises a flange 18 made in one piece and extended radially over at least part of the circumference of the bearing 1.

This flange 18 has two faces 19, 20 which extend radially in a transverse elevation plane, connected by a circumferential face 21, and has in it through holes 22 for the association of the fixed raceway 2 with the interface 5 by screwing.

Figure 1:
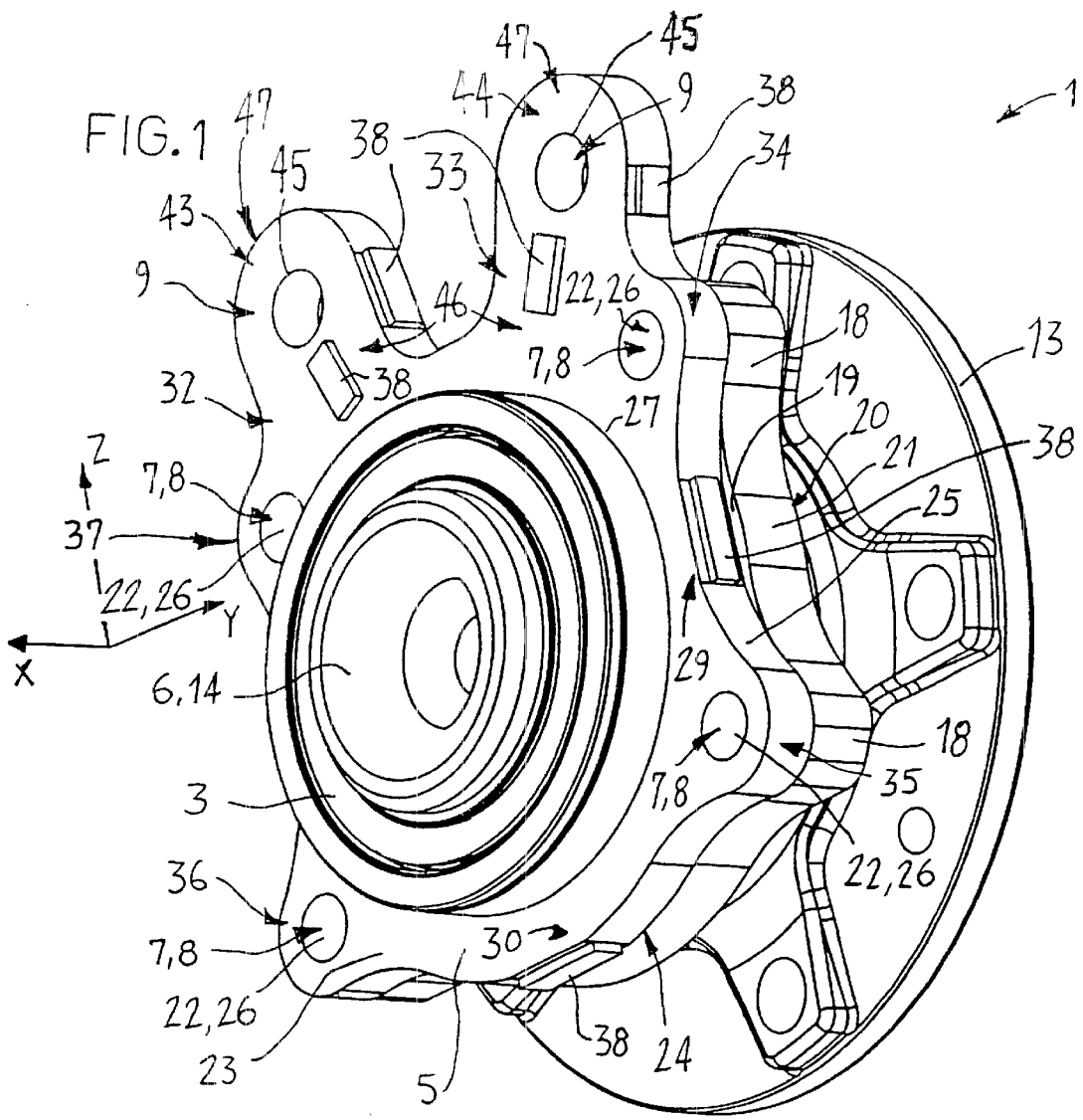
Figure 2:
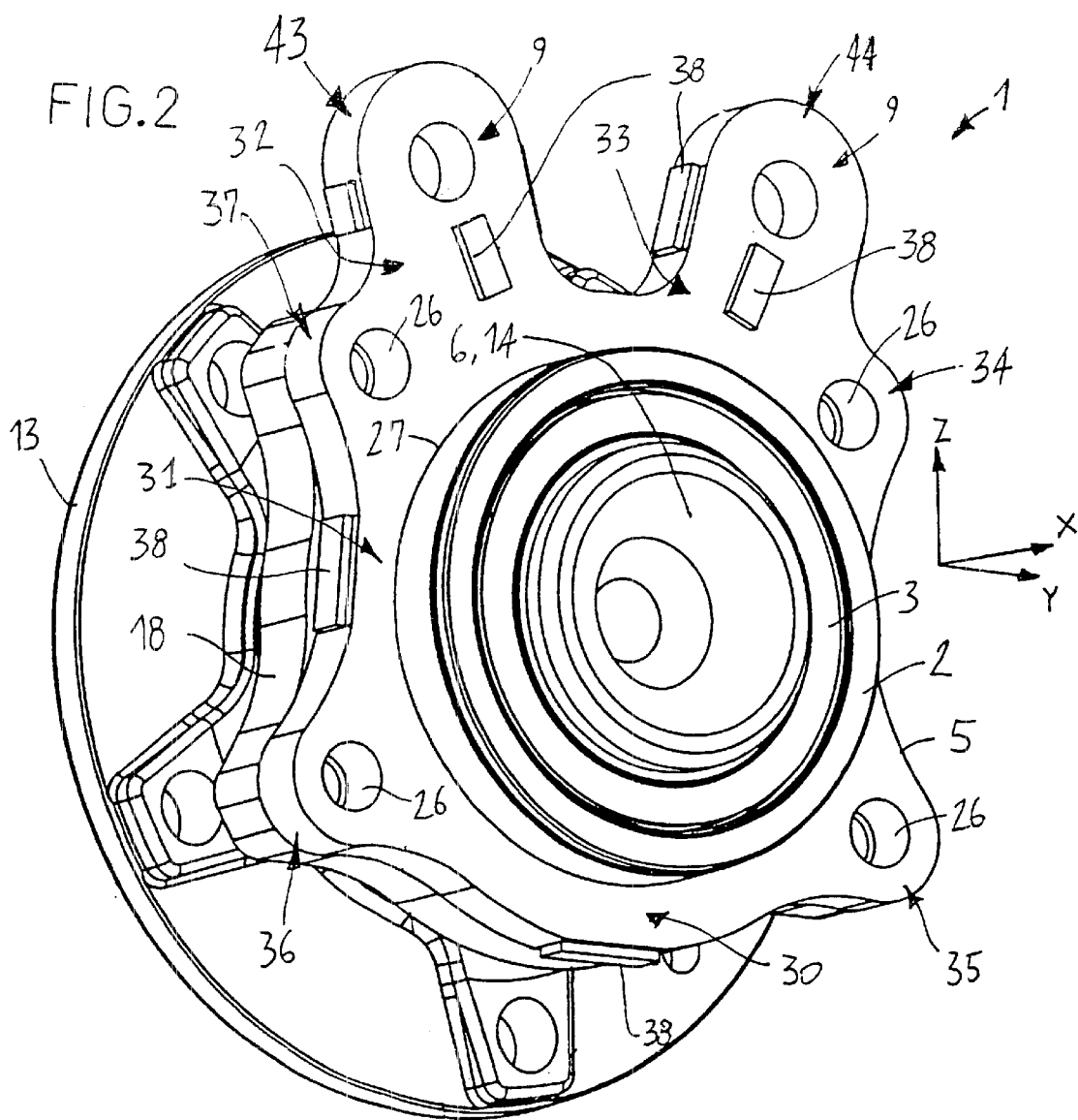
FIG. 2 is a perspective view of the bearing depicted in FIG. 1, according to another angle of view.
Figure 3:
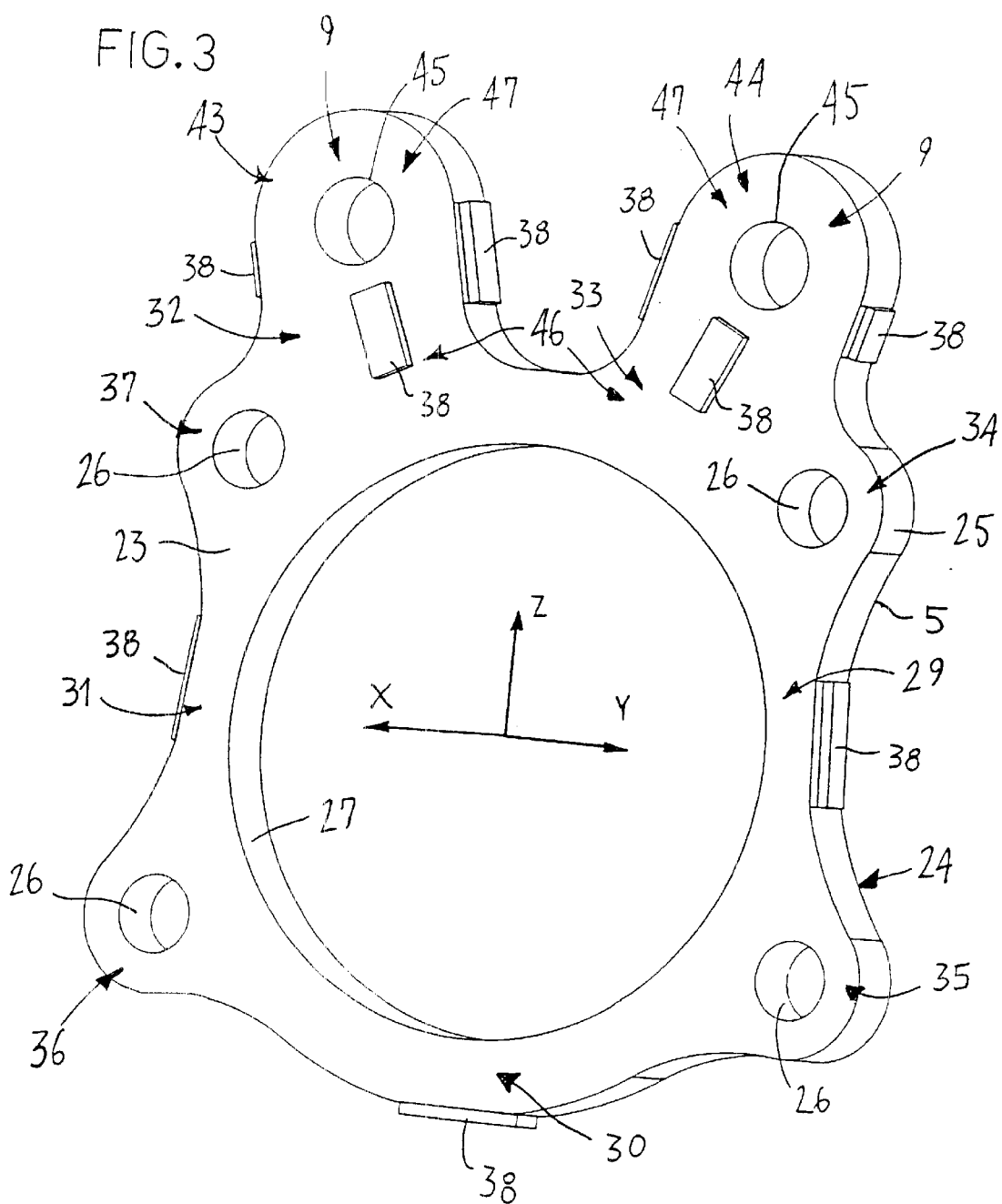
FIG. 3 is a perspective view of the interface of the previous figures which shows the first and second fixing means, the first fixing means also forming means of association with the fixed raceway; the interface has elastic deformation zones on which sensors are disposed for measuring the deformations caused by the forces to which the bearing is subjected.

As depicted notably in FIG. 3, the interface 5 has two faces 23, 24 which extend radially in a transverse elevation plane and are connected by a circumferential face 25.

Through holes 26 are formed in the interface 5 so that they are disposed opposite the holes 22 in the flange 18 in order to be able to provide the association of the interface 5 with the fixed raceway 2 by screwing.

The interface 5 also has a bore 27 with a diameter substantially greater than the outside diameter of the fixed raceway 2 so as to be able to come and nest thereon.

During association, the interface 5 is first of all nested on the fixed raceway 2 with the holes 22, 26 opposite each other and with the faces 24, 20 pressed against each other, and then the associations effected by screwing so as to obtain an assembly according to the invention.

According to a first embodiment depicted in FIGS. 1 to 4, the holes 26 also serve as first means 8 for fixing the assembly to the fixed structure.

For this purpose, the association of the assembly is then effected at the same time as its fixing to the fixed structure, by means of screwing through on the one hand the holes 22, 26 and on the other hand a hole provided in the fixed structure.

According to a second embodiment depicted in FIGS. 5 to 10, supplementary holes 28 are formed in the interface 5 so as to be able to associate the assembly previously assembled with the fixed structure by screwing.

Being associated on the one hand with the fixed structure by means of the interface 5 and on the other hand with the rotating member 6 by means of the rotating raceway 3, the assembly is subjected to and transmits the forces at least partly, and thereby constitutes a favoured measuring place.

According to the invention, the measurement of these forces is effected on the interface.

To this end, the interface 5 has at least one elastic deformation zone 29–33 deformable under the action of forces exerted on the assembly.

The material from which the interface 1 is produced and the form of the deformation zones 29–33 are chosen so that the deformations do not exceed the elastic limit of the material.

Moreover, the interface 5 being associated during the measurements with the fixed raceway 2, the material and the form of the flange 18 are chosen so as to permit the deformations of the zones 29–33 within the elastic limit.

According to one example embodiment, the material from which the interface 5 and the bearing 1 is produced is a steel conventionally used in the field of bearings.

According to another example embodiment, the interface 5 can serve as protection against galvanic corrosion between the fixed structure and the fixed raceway 2 of the bearing 1.

To this end, either the nature of the material forming the interface 5 affords this protection or the interface 5 is coated, at least on the zones in contact, with a suitable coating.

According to a third example embodiment, the interface 5 can be produced from light alloy so as to reduce the on-board weight.

According to a first embodiment depicted in FIGS. 1 to 4, the interface 5 comprises four first radial projections 34–37 in which the holes 26 are provided, and forming the first fixing means 8 and the association means 7 mentioned above.

According to the second embodiment depicted in FIGS. 5 to 10, the interface 5 comprises four first radial projections 34–37 in which there are provided the holes 26 which form the first fixing means 8 and four holes 28 forming the association means 7.

The interface 5 has a thickness (that is to say the distance separating its two faces 23, 24, or the transverse dimension of its circumferential face) sufficient both for providing a rigid fixing of the bearing 1 to the fixed structure and to allow deformation of the zones 29–33 under the effect of the forces undergone.

According to an embodiment illustrated in FIGS. 1 to 10, the flange comprises hollow zones 29–33, whose radial and/or axial dimensions are less than the radial or respectively axial dimensions of the first projections 34–37.

According to one embodiment (FIGS. 1 to 4), the first radial projections 34–37 are disposed at 90° with respect to each other, the hollow zones 29–33 being interposed between the first projections 34–37.

These hollow zones, which aim to facilitate the local deformations of the interface 5, form the deformation zones 29–33 mentioned above.

In order to make it possible to measure these deformations, and consequently the forces to which the bearing 1 is subjected, at least one sensor 38 is associated functionally with at least one, and for example with each elastic deformation zone 29–33.

For example, each sensor 38 can be produced from elements chosen from amongst:

strain gauges based on piezoresistive elements;
acoustic surface wave sensors;
magnetic field sensors, for example based on sensitive elements of the magnetoresistor, giant magnetoresistor, Hall effect or tunnel effect magnetoresistor type.

Figure 11:
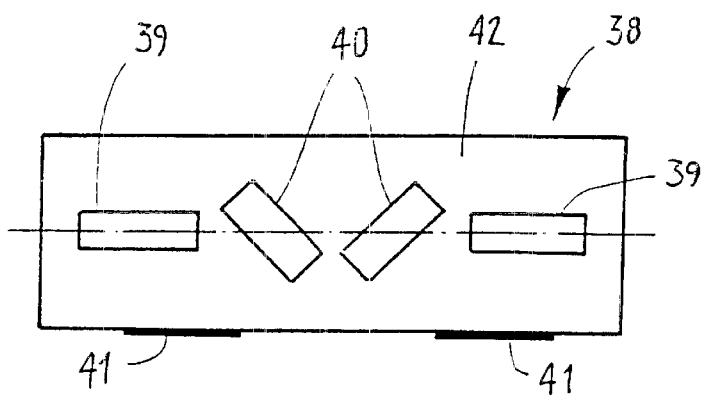
FIG. 11 is a plan view from above of a sensor with which the interface of the previous figures is provided, according to an embodiment in which it comprises, on its top face, four strain gauges mounted in a bridge which are glued to a substrate, making it possible to measure the bending and twisting deformations undergone by the substrate.

According to one embodiment illustrated in FIGS. 11 and 12, which illustrate a sensor 38 in close-up, the latter is produced from strain gauges 39–41 whose ohmic value varies linearly as a function of the elongation.

The sensor 38 comprises for example a dielectric substrate forming a plate 42 on which the gauges 39–41 are glued or formed by screen-printing or equivalent process.

For example, two bending gauges 39 and two torsion gauges 40 are disposed on the same top face of the plate, whilst two bending gauges 41 are disposed on the same lateral face of the plate 42.

These strain gauges have a current flowing through them and are inserted for example in a low-voltage Wheatstone bridge circuit, making it possible to measure the ohmic value of each of the strain gauges.

It is possible to deduce therefrom the deformations undergone by the plate 42 under torsion on the one hand and under flexion in two perpendicular directions on the other hand.

The plate 42 being rigidly fixed to the flange on a deformation zone 29–33, for example by gluing or welding, it is possible to deduce therefrom the deformations of the deformation zone 29–33, and consequently the stresses to which it is subjected.

The sensors 38 can be disposed on the transverse faces 23, 24 of the interface 5 and/or on its circumferential face 25 in the vicinity of or on a deformation zone 29–33, the first projections 34–37 being rigidly fixed to the fixed structure.

In addition, the interface 5 comprises, according to an embodiment illustrated in FIGS. 1 to 10, second means 9 of fixing the brake calliper 15 to the interface 5.

According to variant embodiments, not shown, these second fixing means 9 associate another type of device intended to apply a force to the rotating member 6.

According to one embodiment, the interface 5 comprises at least one and for example two radial projections 43, 44 comprising through holes 45 for fixing the calliper 15 by screwing, and forming the second fixing means 9.

The second projections 43, 44 comprise, from the inside to the outside, a base zone 46 and an end zone 47 in which the holes 45 are formed.

According to an embodiment illustrated in FIGS. 1 to 10, the two second projections 43, 44 are interposed between two consecutive first projections 34, 35, so that the interface 5 has a plane of symmetry of longitudinal elevation, and the radial dimension of the second projections 43, 44 is greater than the radial dimension of the first projections 34–37.

According to the embodiments depicted, the first 34–37 and second 43, 44 projections are disposed in the same plane, but they can also be disposed in two planes, coplanar or not.

The second projections 43, 44 forming the sole support for the brake calliper 15, this being separate from the chassis of the vehicle, all the forces and the braking torque applied by the latter to the disk 12 are transmitted to the interface 5 by means of the second projections 43, 44.

It is wished to measure these forces, and their moments in the three directions X, Y, Z, so as to deduce therefrom notably the braking torque.

For this purpose, the second projections 43, 44 each comprise at least one elastic deformation zone on which—or in the vicinity of which—there is disposed a sensor 38 as described above, able to measure the deformation which it undergoes during braking, in the three directions X, Y, Z.

This elastic deformation zone is for example merged with the base zone 46 of the second projections 43, 44.

According to one embodiment, two sensors 38 are disposed on the circumferential face 25 of the interface 5, on each side and at the base of each second projection 43, 44.

A sensor 38 can be disposed at the base of each projection 43, 44, on one of the transverse faces 23, 24 of the interface 5, or on each of them.

In order to improve the precision of the measurements, it is possible to combine the arrangement of the sensors 38 on the circumferential face 25 and on the transverse faces 23, 24 of the interface 5.

Figure 4:
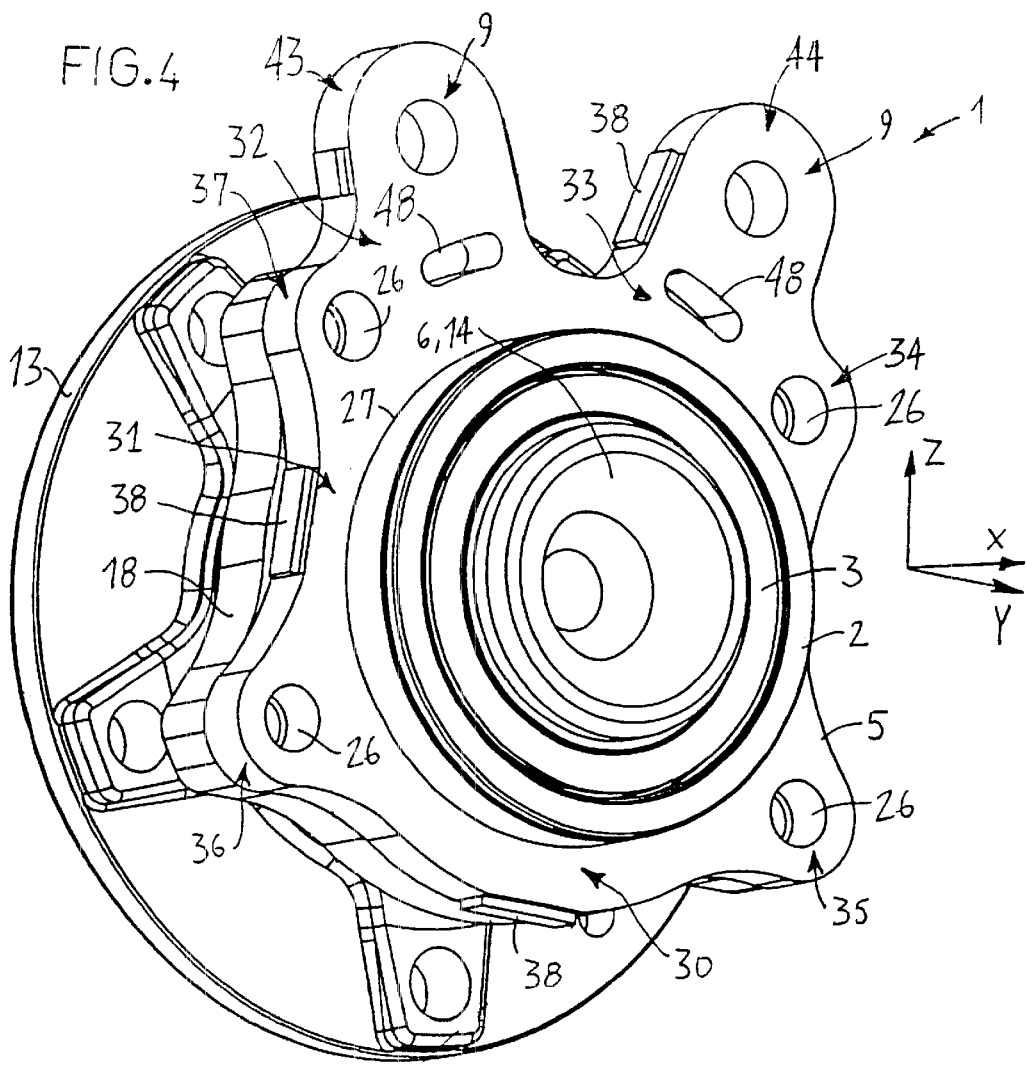
FIG. 4 is a perspective view of an assembly similar to that of FIGS. 1 and 2, in which openings are formed in the vicinity of the second fixing means so as to increase the magnitude of the elastic deformations generated by the forces.
Figure 5:
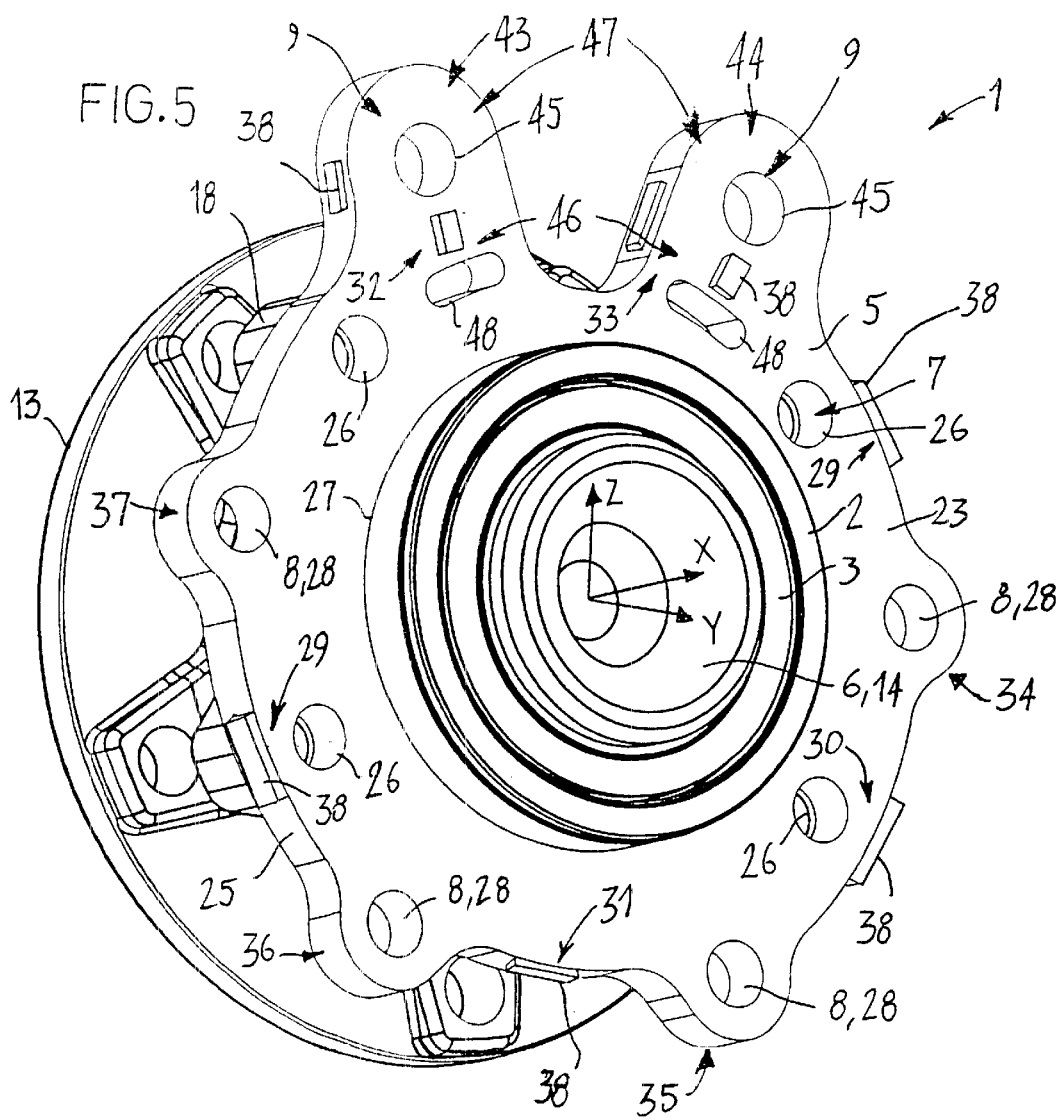
FIG. 5 is a perspective view of an assembly according to a second embodiment, in which the first fixing means are distinct from the association means; according to an embodiment illustrated, openings being formed in the vicinity of the second fixing means so as to increase the magnitude of the elastic deformations generated by the forces.

As a variant, depicted in FIG. 4, an opening 48 is formed in each base part 46 of the second projections 43, 44. These openings 48 are formed by a through oblong hole and their function is to increase the magnitude of the elastic deformations generated by the forces so as to improve the measurements.

In addition, at least one sensor 38 can be disposed on an internal face 54 of the opening 48 so as to form an instrumented deformation zone.

Figure 6:
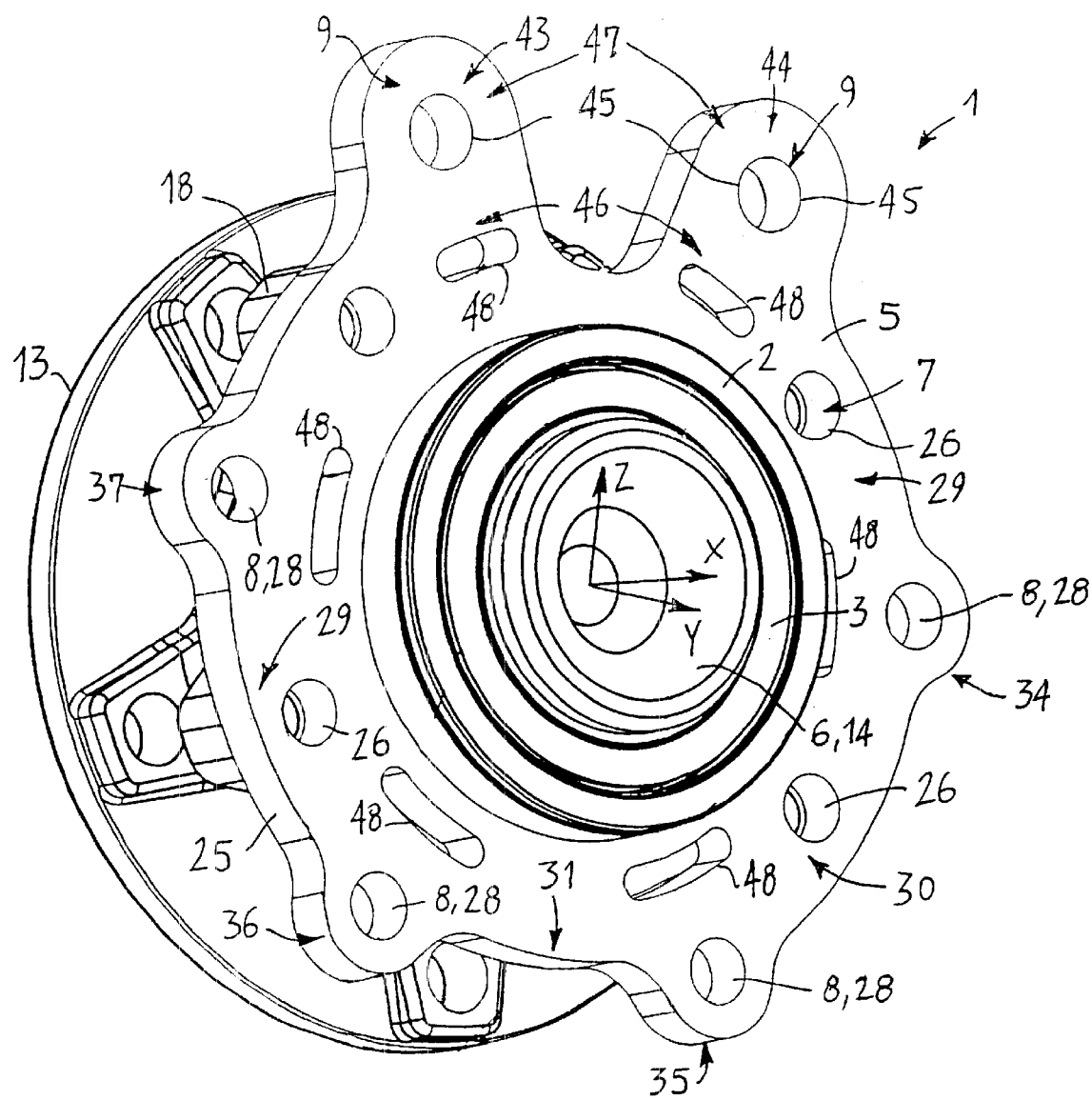
FIG. 6 is a perspective view of an assembly similar to that of FIG. 5, in which openings are also formed in the vicinity of the first fixing means so as to increase the magnitude of the elastic deformations generated by the forces.

In a variant, depicted in FIG. 6, openings 48 are also formed in the vicinity of the holes 28.

The adjustment of the number and form of the openings 48 can be effected by an expert according to the magnitude of the elastic deformations detectable by the sensors 38.

Figure 7:
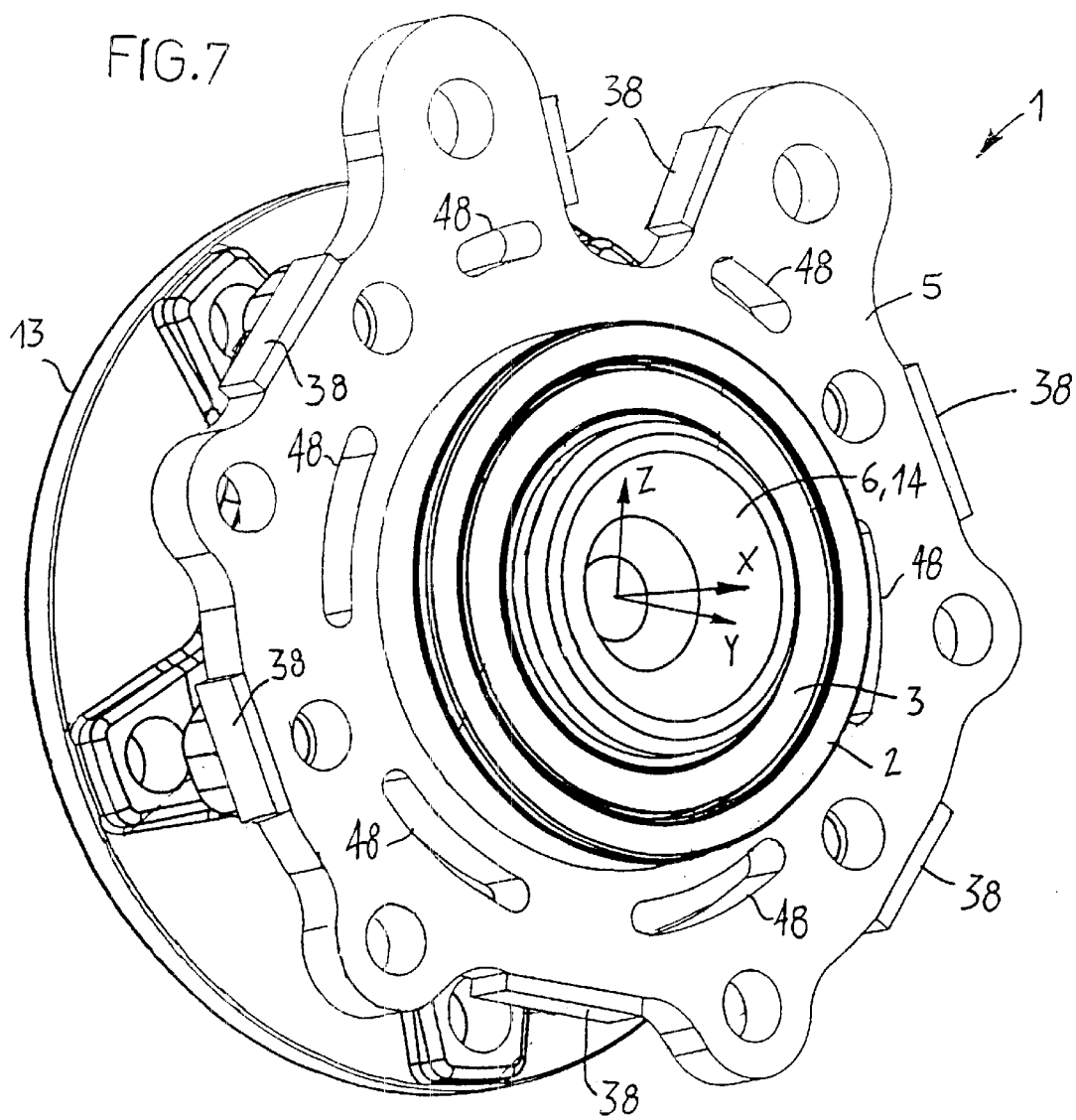
FIG. 7 is a perspective view of an assembly similar to that of FIG. 6, in which the shape of the openings provided in the vicinity of the first fixing means is different.
Figure 8:
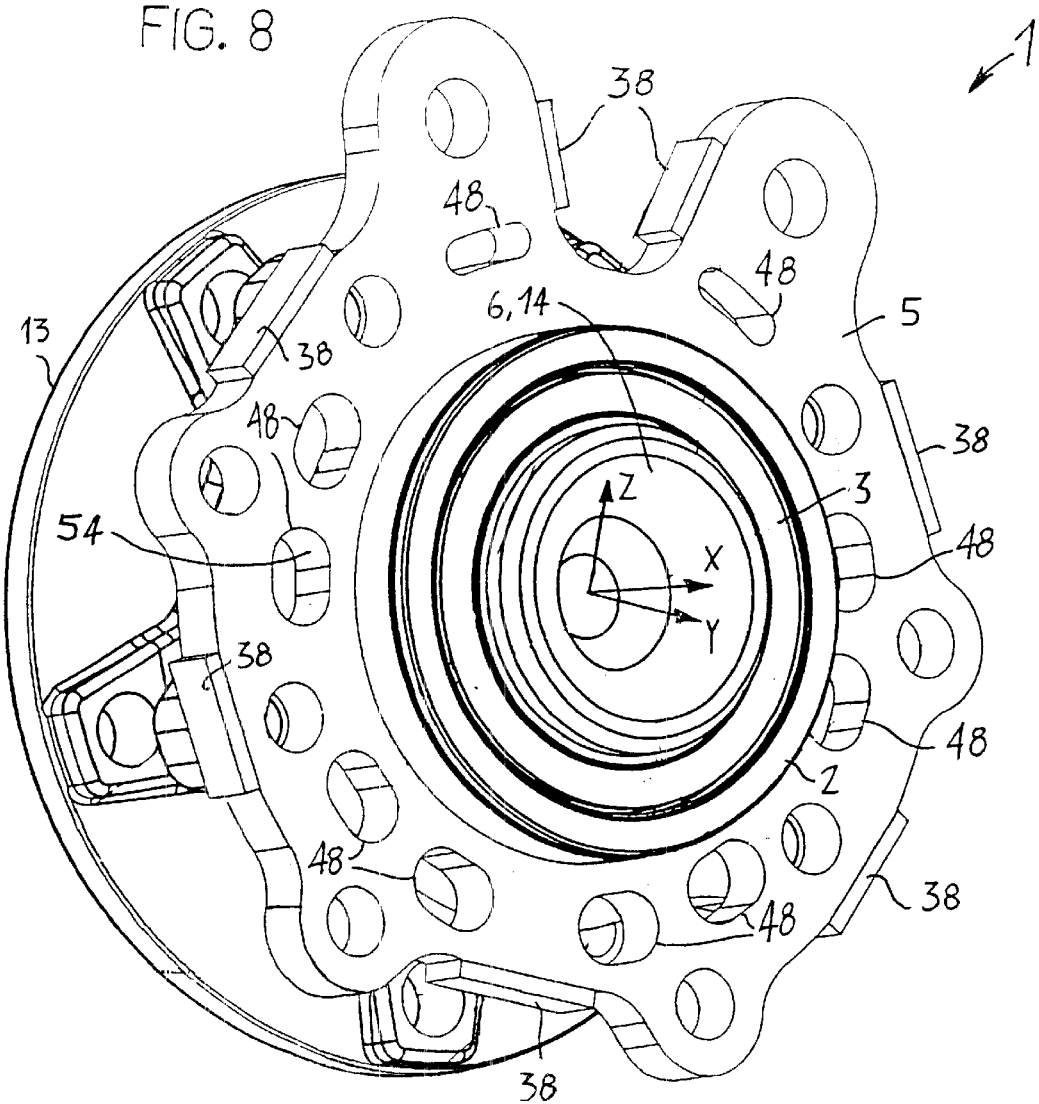
FIG. 8 is a perspective view of an assembly similar to that of FIG. 5, in which double openings are provided in the vicinity of the first fixing means.

By way of example, two complementary embodiments are depicted in FIGS. 7 and 8.

According to one embodiment, illustrated in FIG. 13, the information resulting from the measurement by the sensors 38 of the deformations of the interface 5, in the one hand in the vicinity of the first fixing means 8 and on the other hand in the vicinity of the second fixing means 9, are collected by a control device 49.

This control device 49 comprises for example a computer 50 connected to the sensors 38, which calculates the strains undergone by the interface 5 at the sensors, derives therefrom the resultants Fx, Fy, Fz of the forces to which the interface 5 is subjected, respectively in the directions X, Y, Z, and their moments Mx, My, Mz in these directions.

In this way, the computer calculates notably the braking torque applied by the calliper 15 to the disk 12.

In a variant, the assembly 1 is associated with each wheel of the vehicle so that the computer 50 can measure the braking torque and/or the forces to which each wheel is subjected.

According to one embodiment, illustrated in FIG. 13, the control device 49 also comprises four servomotors 51–53, 55 connected on the one hand to the computer 50 and on the other hand respectively to the braking system, to the steering system and to the acceleration system of the vehicle, in order to regulate respectively the braking, the steering, the acceleration and the suspension thereof according to the values of the forces Fx, Fy, Fz and the moments Mx, My, Mz calculated by the computer.

In a variant, the bearing 1 can be instrumented by a magnetic coder associated with the rotating raceway 3 or forming a sealing joint and a sensor associated with the fixed raceway 2 so as to measure the speed of rotation of the rotating member.

In this variant, the speed of rotation can be implemented in the control device 49 so as to be able to be used during the regulation of the vehicle controls.

What is claimed is:

1. An assembly comprising:
    a bearing (1) comprising a fixed raceway (2) intended to be associated with a fixed structure, a rotating raceway (3) intended to be associated with a rotating member (6); and
    a mechanical interface (5) associated with the said fixed raceway (2) by means of association means (7), this interface (5) being intended to be interposed between the fixed raceway (2) of the bearing (1) and the fixed structure, the said interface (5) comprising:
    first means (8) of fixing to the fixed structure;

second means (9) of fixing a device (10) intended to apply a force to the rotating member (6); and at least one elastic deformation zone (29–33) able to be deformed under the action of forces exerted on the said assembly, at least one sensor (38) able to measure the said forces causing deformation of said elastic deformation zone (29–33);

characterised in that the interface (5) comprises two flat faces (23, 24) extending radially and connected together by a circumferential face (25), a bore (27) with a diameter substantially greater than the outside diameter of the fixed raceway (2) being formed in the said interface (5);

characterised in that the interface (5) comprises second radial projections (43, 44) forming second means (9) of fixing to the bearing the device (10) intended to apply a force to a rotating part (6) associated with the rotating raceway (3), the projections (43, 44) each comprising a base zone (46) and an end zone (47);

characterised in that the said second projections (43, 44) comprise axial holes (45) for fixing the said device (10) by screwing, located in the end zone (47), at least one sensor (38) being disposed on or in the vicinity of the base zone (46), this forming an elastic deformation zone (32, 33);

characterised in that two sensors (38) are disposed on the circumferential face (25), on each side of each second projection (43, 44).

2. Assembly according to claim 1, characterised in that the said interface (5) comprises first radial projections (34–37) in which axial holes (26) are formed for fixing the assembly by screwing onto the fixed structure, two adjacent projections being separated by a zone with a lesser axial and/or radial dimension forming an elastic deformation zone (29–33), on which the sensor or sensors (38) are disposed.

3. An assembly comprising:
a bearing (1) comprising a fixed raceway (2) intended to be associated with a fixed structure, a rotating raceway (3) intended to be associated with a rotating member (6); and a mechanical interface (5) associated with the said fixed raceway (2) by means of association means (7), this interface (5) being intended to be interposed between the fixed raceway (2) of the bearing (1) and the fixed structure, the said interface (5) comprising:
first means (8) of fixing to the fixed structure;
second means (9) of fixing a device (10) intended to apply a force to the rotating member (6); and
at least one elastic deformation zone (29–33) able to be deformed under the action of forces exerted on the said assembly, at least one sensor (38) able to measure the said forces causing deformation of said elastic deformation zone (29–33);

characterised in that the said interface (5) comprises four first projections (34–37) disposed substantially at 90° with respect to each other, defining between them four elastic deformation zones (29–31) on each of which at least one sensor (38) is disposed.

4. Assembly according to claim 1, characterised in that at lest one sensor (38) is disposed on one of the flat faces (23, 24).

5. Assembly according to claim 1, characterised in that a radial dimension of the second projections (43, 44) is greater than a radial dimension of the first projections (34–37).

6. An assembly comprising:
a bearing (1) comprising a fixed raceway (2) intended to be associated with a fixed structure, a rotating raceway (3) intended to be associated with a rotating member (6); and a mechanical interface (5) associated with the said fixed raceway (2) by means of association means (7), this interface (5) being intended to be interposed between the fixed raceway (2) of the bearing (1) and the fixed structure, the said interface (5) comprising:
first means (8) of fixing to the fixed structure;
second means (9) of fixing a device (10) intended to apply a force to the rotating member (6); and
at least one elastic deformation zone (29–33) able to be deformed under the action of forces exerted on the said assembly, at least one sensor (38) able to measure the said forces causing deformation of said elastic deformation zone (29–33);

characterised in that the interface (5) comprises:
four first projections (34–37) disposed substantially at 90° with respect to each other, defining between them three elastic deformation zones (29–31) on each of which at least one sensor (38) is disposed; and
two second projections (43, 44) located between two adjacent first projections (37, 34), each second projection (43, 44) being provided with at least one sensor (38).

7. Assembly according to claim 1, characterised in that openings (48) are formed in the first (34–37) and/or second (43, 44) projections.

8. Assembly according to claim 1, characterised in that the first fixing means (8) also form means (7) of associating the interface (5) with the fixed raceway (2) of the bearing (1).

9. Assembly according to claim 8, characterised in that the fixed raceway (2) comprises a flange (18) comprising radial projections in which axial holes (22) are formed, disposed opposite those (28) of the first fixing means (8) so as to provide the fixing of the interface (5) by screwing onto the bearing (1).

10. Assembly according to claim 1, characterised in that the means (7) of associating the interface (5) on the bearing is provided on the fixed raceway (2), and the first (8) and second (9) fixing means are provided on the interface (5).

11. Assembly according to claim 10, characterised in that the fixed raceway (2) comprises a radial flange (18), axial holes (26) being formed opposite the said flange (18) and in the interface (5) so as to provide their association by screwing.

12. Assembly according to claim 1, characterised in that the elastic deformation zone or zones (29–33) are located in the vicinity of the first (8) and/or second (9) fixing means and/or in the vicinity of the association means (7).

13. Assembly according to claim 12, characterised in that the sensor or sensors (38) located in the vicinity of the first fixing means (8) and/or in the vicinity of the association means (7) are arranged so as to measure the forces applied to the first fixing means (8) and/or transmitted to the fixed raceway (2), and their respective moments, according to three orthogonal directions forming a trihedron together.

14. Assembly according to claim 12, characterised in that the sensor or sensors (38) located in the vicinity of the second fixing means (9) are arranged so as to measure the forces applied to the second fixing means (9), and their respective moments, in three orthogonal directions forming a trihedron together.

15. Assembly according to claim 1, characterised in that the sensors (38) are or comprise strain gauges based on piezoresistive elements.

16. Assembly according to claim 1, characterised in that the sensors (38) are or comprise acoustic surface wave sensors.

17. Assembly according to claim 1, characterised in that the sensors (38) are or comprise magnetic field sensors.

18. Assembly according to claim 1, characterised in that at least one sensor (38) is disposed on an intermediate part (42) fixed to an elastic deformation zone (29–33) by embedding, welding, gluing or the like.

19. Braking assembly comprising an assembly according to claim 1 and a brake calliper (15) associated with the mechanical interface (5) by means of the second fixing means (9), the said calliper (15) being separate from the fixed structure.

20. Braking assembly according to claim 19, characterised in that it also comprises a brake disc (12) associated with the rotating raceway (3), inserted between the jaws (16, 17) of the calliper (15) SO that the latter applies a braking force to it by the bringing together of the jaws (16, 17).

21. Application of assemblies according to claim 19, to the measurement on the one hand of the braking torque of a vehicle and on othe other and of the longitudinal, transverse and vertical forces exerted on one or each of its wheels, in which an assembly is associated with one or each of the wheels, the torque being measured by means of the sensors (38) located in the vicinity of the second fixing means (9) and/or in the vicinity of the association means (7) and the forces by means of the sensors (38) located in the vicinity of the first fixing means (8).

22. Application according to claim 21, in which a control device (49) collects the measurements of the braking torque and/or of the forces exerted on the wheels, this device being arranged so as to regulate at least one dynamic control of the vehicle, notably the braking, the acceleration, the steering or the suspension as a function of the said measurements.

* * * * *